(12) United States Patent
Choe et al.

(10) Patent No.: US 11,028,189 B2
(45) Date of Patent: Jun. 8, 2021

(54) PREPARATION METHOD OF ANIONIC POLYMERIZATION INITIATOR, DEVICE FOR MANUFACTURING ANIONIC POLYMERIZATION INITIATOR AND ANIONIC POLYMERIZATION INITIATOR PREPARED THEREFROM

(71) Applicant: LG Chem, Ltd., Seoul (KR)

(72) Inventors: Jae Hoon Choe, Daejeon (KR); Jong Young Choi, Daejeon (KR); Jung Yong Lee, Daejeon (KR); Dong Cheol Choe, Daejeon (KR); Hyun Ju Kim, Daejeon (KR); Hyeon Hui Kim, Daejeon (KR); Jong Min Shin, Daejeon (KR); Woong Chan Jeong, Daejeon (KR); Kwang Ho Song, Daejeon (KR)

(73) Assignee: LG Chem, Ltd.

( * ) Notice: Subject to any disclaimer, the term of this patent is extended or adjusted under 35 U.S.C. 154(b) by 527 days.

(21) Appl. No.: 15/744,565

(22) PCT Filed: Jul. 27, 2016

(86) PCT No.: PCT/KR2016/008191
§ 371 (c)(1),
(2) Date: Jan. 12, 2018

(87) PCT Pub. No.: WO2017/047923
PCT Pub. Date: Mar. 23, 2017

(65) Prior Publication Data
US 2018/0208684 A1    Jul. 26, 2018

(30) Foreign Application Priority Data

Sep. 17, 2015 (KR) .................. 10-2015-0131451
Jun. 14, 2016 (KR) .................. 10-2016-0073769

(51) Int. Cl.
*C08F 2/01* (2006.01)
*C07F 1/02* (2006.01)
(Continued)

(52) U.S. Cl.
CPC .............. *C08F 2/01* (2013.01); *B01F 5/0604* (2013.01); *C07F 1/02* (2013.01); *C08F 2/04* (2013.01);
(Continued)

(58) Field of Classification Search
USPC .......................................... 564/509; 526/180
See application file for complete search history.

(56) References Cited

U.S. PATENT DOCUMENTS 5,491,230 A     2/1996 Lawson et al.
5,502,131 A *   3/1996 Antkowiak ............. C08C 19/44
                                                          525/332.3
(Continued)

FOREIGN PATENT DOCUMENTS

CN    102933609 A    2/2013
CN    102933613 A    2/2013
(Continued)

OTHER PUBLICATIONS

Hirotsugu Usutani et al., "Generation and Reactions of o-Bromophenyl-lithium without Benzyne Formation Using a Microreactor", Journal of the American Chemical Society, Feb. 27, 2007, vol. 129, No. 11, pp. 3046-3047, XP055498746.
(Continued)

*Primary Examiner* — Fred M Teskin
(74) *Attorney, Agent, or Firm* — Lerner, David, Littenberg, Krumholz & Mentlik, LLP

(57) ABSTRACT

An method for preparing an anion polymerization initiator, a device for preparing the same and an anion polymerization initiator prepared therefrom are provided. And the method
(Continued)

for preparing an anion polymerization initiator according to present invention is characterized in that an amine compound of Formula 1 and/or Formula 2; an organometallic compound; and/or a conjugated diene compound are introduced in the form of a solution and reacted.

14 Claims, 4 Drawing Sheets

(51) Int. Cl.

| | |
|---|---|
| C08F 236/10 | (2006.01) |
| C08F 2/04 | (2006.01) |
| C08F 2/44 | (2006.01) |
| C08F 2/60 | (2006.01) |
| C08F 4/08 | (2006.01) |
| C08K 5/34 | (2006.01) |
| B01F 5/06 | (2006.01) |
| C08F 4/10 | (2006.01) |
| C08F 236/14 | (2006.01) |
| C08K 5/19 | (2006.01) |
| C08K 5/3432 | (2006.01) |

(52) U.S. Cl.
CPC ............... *C08F 2/44* (2013.01); *C08F 2/60* (2013.01); *C08F 4/08* (2013.01); *C08F 4/10* (2013.01); *C08F 236/10* (2013.01); *C08F 236/14* (2013.01); *C08K 5/19* (2013.01); *C08K 5/3432* (2013.01)

(56) References Cited

U.S. PATENT DOCUMENTS

| | | | |
|---|---|---|---|
| 5,554,696 A | 9/1996 | Fayt et al. | |
| 5,567,815 A | 10/1996 | Hall et al. | |
| 2002/0120082 A1* | 8/2002 | Hsu | C08F 4/48 526/180 |
| 2002/0173607 A1 | 11/2002 | Brockmann | |
| 2012/0101212 A1 | 4/2012 | Yoon et al. | |
| 2012/0316289 A1 | 12/2012 | Thiele et al. | |
| 2013/0202830 A1 | 8/2013 | Thiele et al. | |
| 2014/0213721 A1 | 7/2014 | Yamada et al. | |
| 2015/0118429 A1 | 4/2015 | Steinhauser et al. | |
| 2016/0159956 A1 | 6/2016 | Thiele et al. | |

FOREIGN PATENT DOCUMENTS

| | | |
|---|---|---|
| CN | 103764683 A | 4/2014 |
| CN | 104271619 A | 1/2015 |
| JP | S4825745 A | 4/1973 |
| JP | S52995 A | 1/1977 |
| JP | H06056910 A | 3/1994 |
| JP | H07196713 A | 8/1995 |
| JP | H08048708 A | 2/1996 |
| JP | H08277306 A | 10/1996 |
| JP | 2013082843 A | 5/2013 |
| JP | 2014177538 A | 9/2014 |
| JP | 2015131873 A | 7/2015 |
| KR | 100658361 B1 | 12/2006 |
| KR | 20110052523 A | 5/2011 |
| KR | 20120139014 A | 12/2012 |
| KR | 20140028132 A | 3/2014 |
| RU | 2264414 C1 | 11/2005 |
| TW | 381102 B | 2/2000 |
| WO | 2006031058 A1 | 3/2006 |
| WO | 2010035990 A2 | 4/2010 |
| WO | 2013035589 A1 | 3/2013 |
| WO | 2015010710 A1 | 1/2015 |

OTHER PUBLICATIONS

Partial Supplementary European Search Report including Written Opinion for Application No. EP16846744.7 dated Aug. 21, 2018.
Hubert P, Soum A, Fontanille M. Structure and reactivity of propagating species in anionic polymerization of 2-vinylpyridine initiated by lithium derivatives in toluene. Macromolecular Chemistry and Physics. Apr. 1995;196(4):1023-30.
Soum AH, Tien CF, Hogen-Esch TE, D'Accorso NB, Fontanille M. Stereoregular anionic polymerization of 2-isopropenylpyridine. Die Makromolekulare Chemie, Rapid Communications. Apr. 1983;4(4):243-8.
Chinese Search Report for Application No. CN201680047458.X dated Aug. 7, 2019.
Search report from International Application No. PCT/KR2016/008193, dated Oct. 20, 2016.
International Search Report From PCT/KR2016/008191 dated Jan. 5, 2017.

* cited by examiner

[Figure 1]
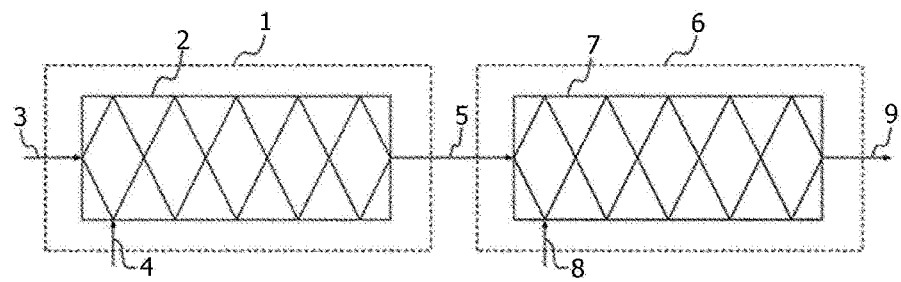
[Figure 2]
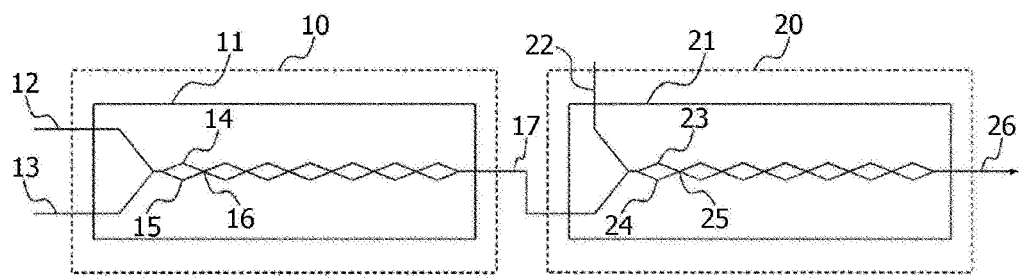
[Figure 3]
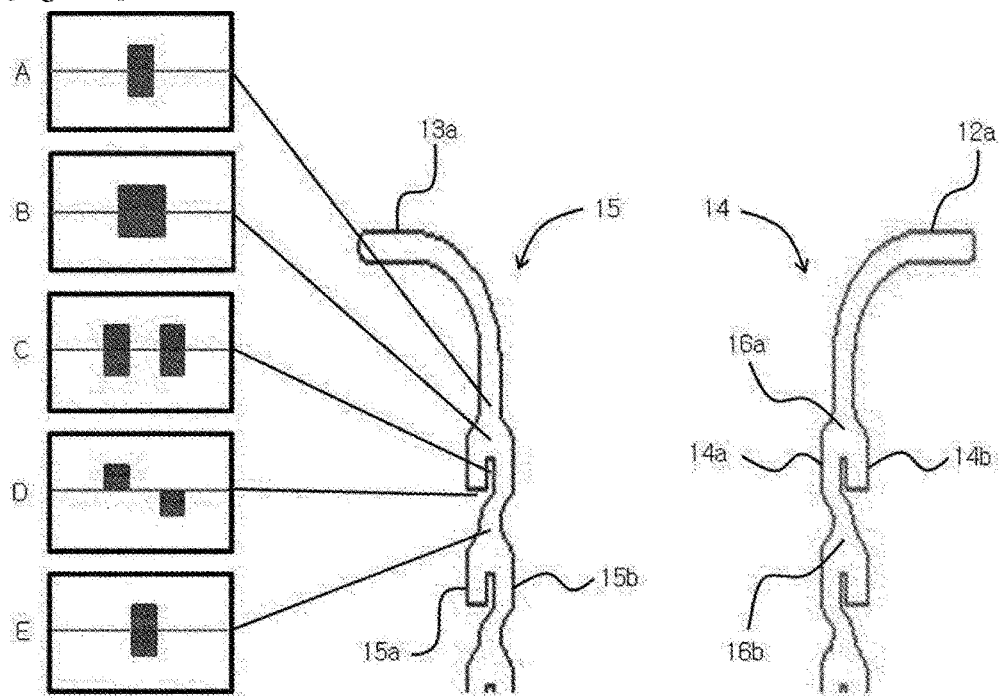

[Figure 4]
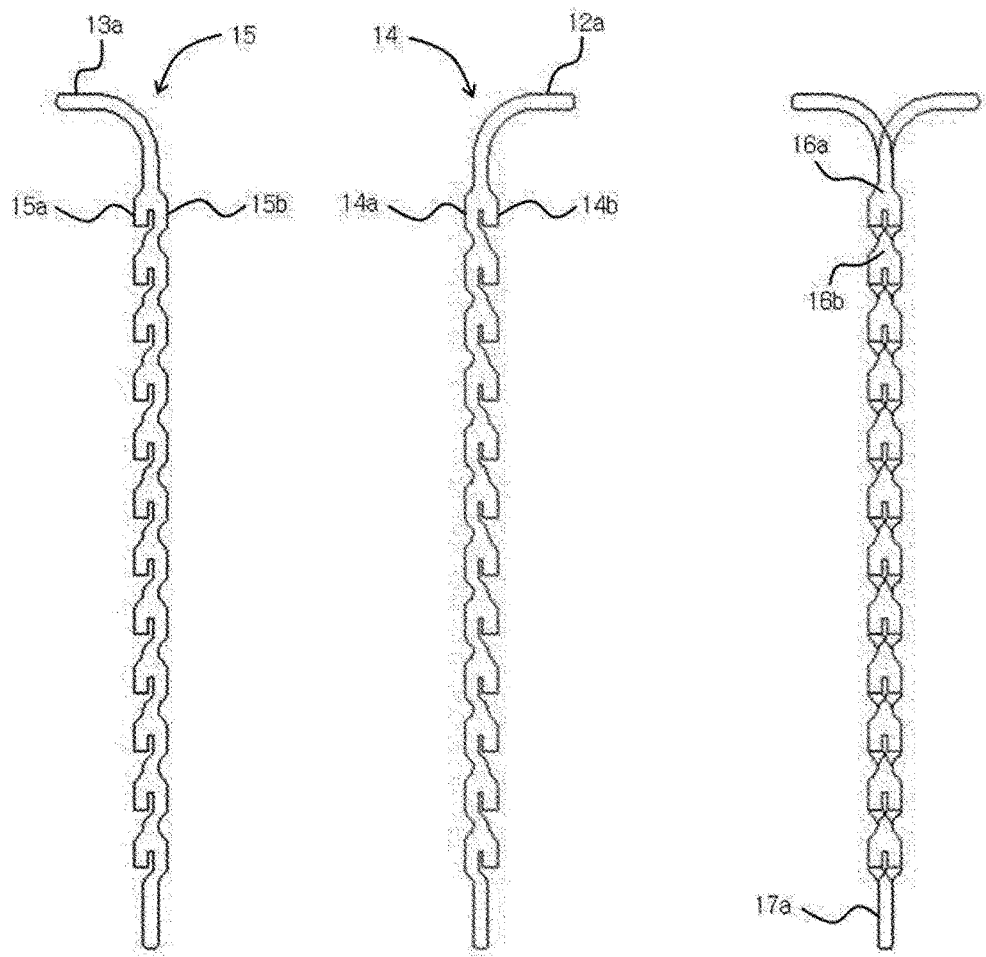
[Figure 5]
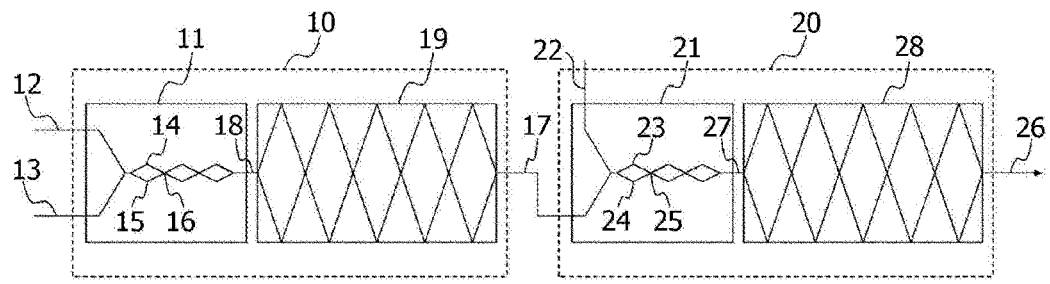

[Figure 6]
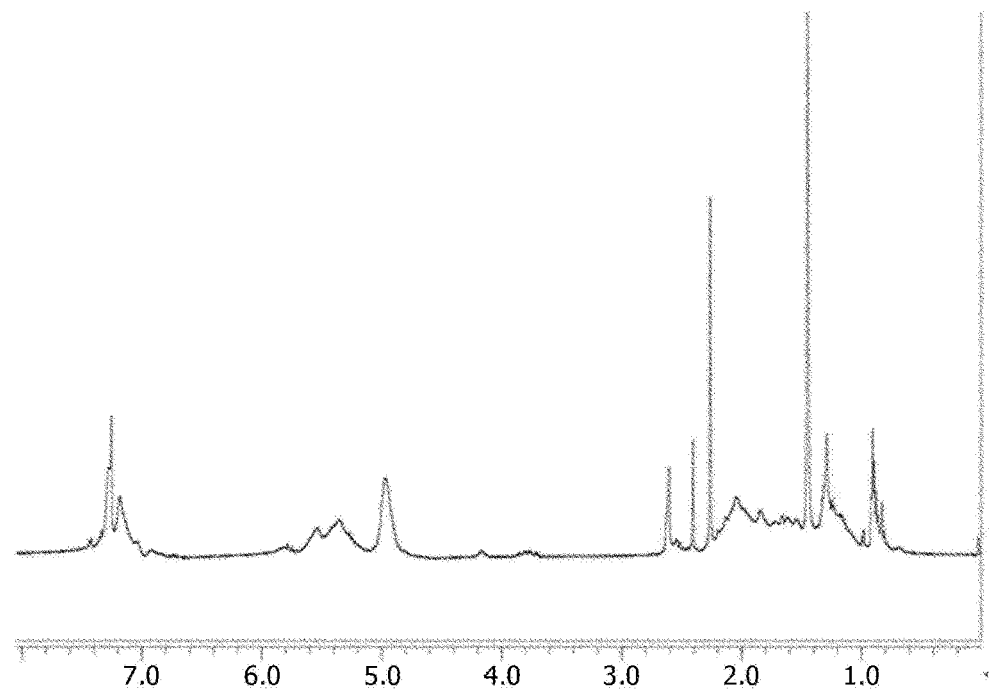
[Figure 7]
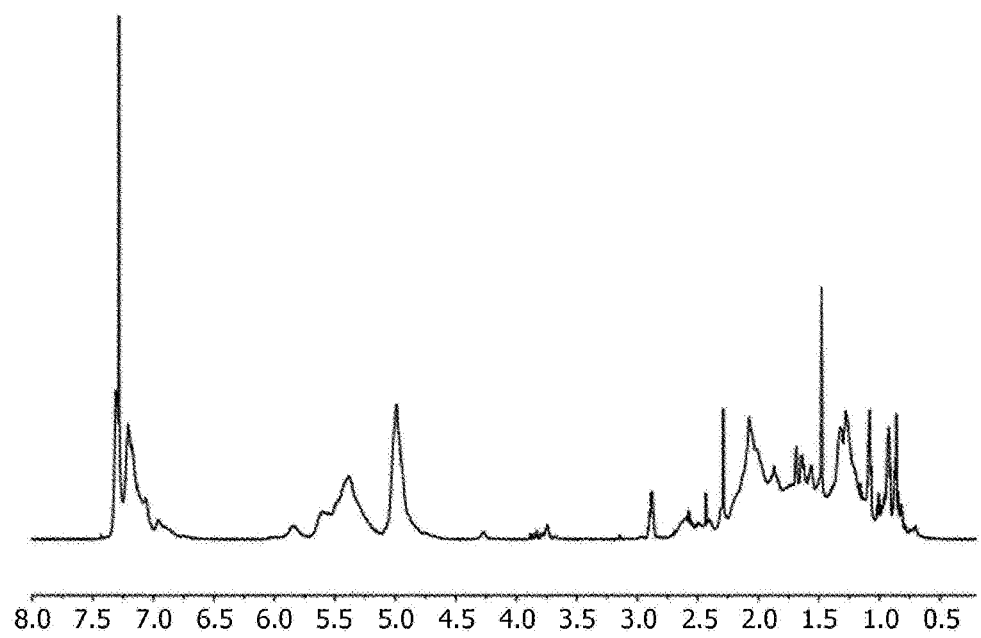

[Figure 8]
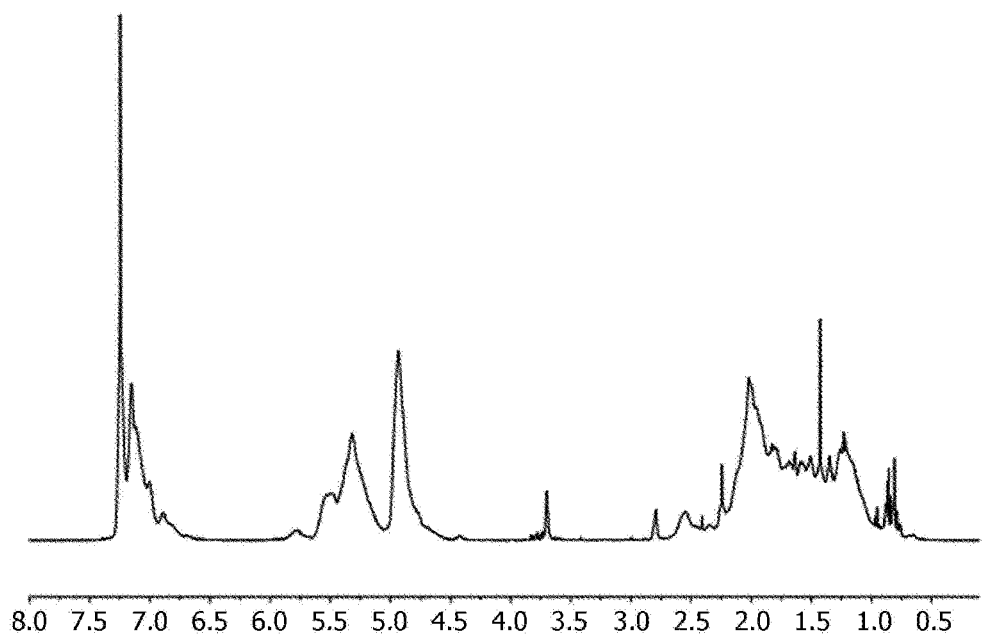

PREPARATION METHOD OF ANIONIC POLYMERIZATION INITIATOR, DEVICE FOR MANUFACTURING ANIONIC POLYMERIZATION INITIATOR AND ANIONIC POLYMERIZATION INITIATOR PREPARED THEREFROM

CROSS-REFERENCE TO RELATED APPLICATIONS

This application is a national phase entry under 35 U.S.C. § 371 of International Application No. PCT/KR2016/008191, filed Jul. 27, 2016, which claims priority to Korean Patent Application No. 10-2015-0131451 filed Sep. 17, 2015; and Korean Patent Application No. 10-2016-0073769, filed Jun. 14, 2016, the disclosures of which are incorporated herein by reference.

TECHNICAL FIELD

The present invention relates to a method for preparing an anionic polymerization initiator, a device for preparing the same, and an anionic polymerization initiator prepared therefrom.

BACKGROUND ART

In order to reduce carbon dioxide emission and improve fuel efficiency, tires are required to have high efficient, environment-friendly, and high performance physical properties, and accordingly tire materials that meet such needs are actively being developed. Particularly, styrene-butadiene rubber (hereinafter, referred to as SSBR) obtained by solution polymerization other than emulsion polymerization has been used as a rubber material for tire treads by having an easy structural change, reducing chain end movement via bonding or modifying the chain ends and increasing a bonding force with carbon black. In addition, as silica fillers had been developed, a low rolling resistance value and a high road surface braking force could be obtained at the same time, but to do this, a technique in which hydrophilic silica is combined with hydrophobic SSBR to be dispersed therein is needed.

Such a method includes a method of wrapping the silica particles themselves in a hydrophobic substance, a method of using a coupling agent between silica and SSBR, and the like. Recently, on anionic polymerization of SSBR, by using a modifying initiator, a modifying monomer, a modifying agent, and the like, techniques for introducing a moiety capable of reacting with and bonding to silica or a moiety serving to assist this into the SSBR polymer chain itself have been developed. In particular, the modifying initiator is used as an essential material for producing such a modified SSBR by initiating the anionic polymerization and simultaneously serving to introduce a functional group into one end of the chain.

Among anionic polymerization initiators used in synthesizing this SSBR, hexamethyleneimine lithium (HMI-Li) initiator is prepared by a reaction of hexamethyleneimine (HMI) and n-butyllithium (BuLi, NBL) as in the following reaction scheme.

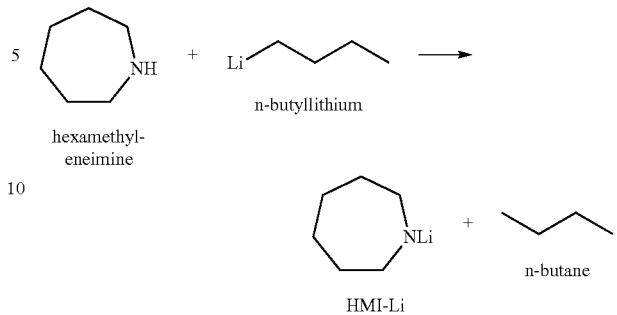

[Reaction Scheme 1]

hexamethyl-eneimine + n-butyllithium → HMI-Li + n-butane

However, HMI-Li may have low solubility in solvents to fall into precipitation over time and to be also used as an initiator, but has a problem that reactivity is lower than that of BuLi. In order to solve this drawback, conventionally, as in the following reaction scheme, a conjugated diene (R) such as isoprene (IP) or 1,3-butadiene (BD) was further reacted via Reaction Scheme 1 to prepare a polymerization initiator. Due to further attachment of such a conjugated diene, the solubility in organic solvents may increase to achieve a stable reaction, and also, the reactivity as an initiator becomes higher than that of HMI-Li, which is sufficient to initiate the anionic polymerization.

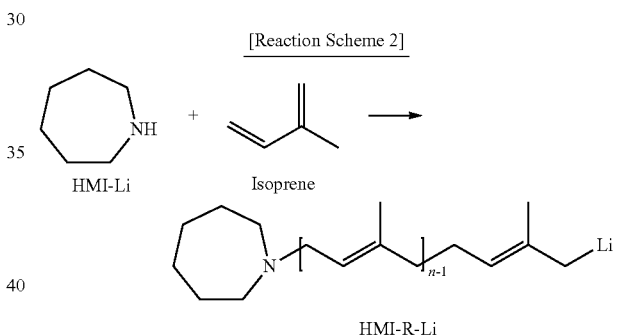

[Reaction Scheme 2]

HMI-Li + Isoprene → HMI-R-Li

In Reaction Scheme 2, n is an integer from 1 to 100.

However, the modified initiator thus produced is also unstable over time to fall into precipitation, or inactivated by combining a very small amount of oxygen with water. Therefore, the existing process in which the above polymerization initiator is prepared in a batch-wise way and then introduced into the polymerization reaction necessarily requires a storage step of the modifying initiator, thereby resulting in the aforementioned disadvantages. This may be a factor that the physical properties of the finally synthesized SSBR are deteriorated by adversely affecting post-processes, and makes it difficult to maintain a constant quality.

In the prior art, an anionic polymerization initiator was prepared by a batch process and then used to prepare a solution-polymerized SSBR. Or in a batch reactor, it was carried out in one pot simultaneously to prepare the anionic polymerization initiator and the solution polymerized styrene-butadiene rubber.

In the case of the former, a step of storing the modifying initiator is inevitably required, where anions of the already synthesized initiator are reacted with various scavengers such as moisture and air for the storage period to lose its activity. This may be a factor that the physical properties of the finally synthesized SSBR are deteriorated by adversely affecting post-processes, and makes it difficult to maintain a constant quality. In the case of the latter, the process is a process in which the polymerization process occurs in the batch reactor simultaneously with the initiator synthesis reaction, whereby the problem of storage could be solved. However, it is difficult to confirm whether the modifying initiator is properly synthesized, and the physical properties are also lower than the case that the synthesized initiator is added. In addition, in all the conventional batch processes raw materials are directly introduced, mixed and reacted to generate by-products or cause reverse reactions to generate unreacted products, so that there is also a problem that a polymerization yield is lowered.

DISCLOSURE

Technical Problem

The present invention is intended to solve the aforementioned problems, and it is an object of the present invention to provide a device for preparing an anionic polymerization initiator which may need no step of storing to prevent instability and inactivation of the polymerization initiator and lowering physical properties of SSBR, to minimize by-products and unreacted products and to remarkably improve a polymerization conversion rate, a method for preparing an anionic polymerization initiator and an anionic polymerization initiator prepared therefrom.

Technical Solution

In order to achieve the above-described object.
the present invention provides a method for preparing an anionic polymerization initiator comprising a step of introducing at least one amine compound selected from compounds of Formulas 1 and 2 and an organometallic compound into a continuous reactor to react them:

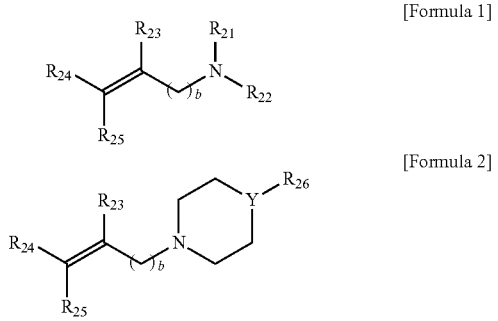

[Formula 1]

[Formula 2]

In Formula 1 and Formula 2 above,
$R_{21}$, $R_{22}$, $R_{23}$, $R_{24}$ and $R_{25}$ independently represent hydrogen, an alkyl group having 1 to 6 carbon atoms, an alkenyl group having 1 to 6 carbon atoms or an alkynyl group having 1 to 6 carbon atoms,
Y represents nitrogen, oxygen or sulfur,
$R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and
b is an integer of 1 to 20.
In addition, the present invention provides a device for preparing an anionic polymerization initiator characterized in that it comprises a mixer; and
a first inflow line and a second inflow line, connected to the mixer,
wherein the first inflow line supplies at least one amine compound selected from compounds of Formulas 1 and 2 according to claim 1, and the second inflow line supplies an organometallic compound.
In addition, the present invention provides
an anionic polymerization initiator selected from compounds of Formulas 10 to 12 below:

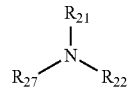

[Formula 10]

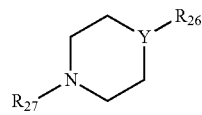

[Formula 11]

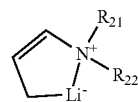

[Formula 12]

In Formulas 10 to 12 above,
$R_{21}$ and $R_{22}$ independently represent an alkyl group having 1 to 6 carbon atoms,
Y represents nitrogen, oxygen or sulfur,
$R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and
$R_{27}$ represents alkenyl lithium having 1 to 20 carbon atoms, alkenyl sodium having 1 to 20 carbon atoms, alkenyl potassium having 1 to 20 carbon atoms, alkenyl magnesium bromide having 1 to 6 carbon atoms or alkenyl magnesium chloride having 1 to 6 carbon atoms.

Advantageous Effects

According to the present invention, by preparing an anionic polymerization initiator using a continuous reactor, the step of storing may be not required to prevent instability and inactivity of the polymerization initiator and deterioration of the physical properties of SSBR, to minimize by-products and unreacted products and to remarkably the conversion rate.

In addition, the polymerization initiator may be synthesized by a continuous polymerization reaction and then introduced directly into a polymerization bath simultaneously with the SSBR raw material to prepare SSBR, whereby it is possible to produce products having stable and constant quality as well as to minimize problems such as degradation in physical properties of SSBR.

In addition to this, since the method for preparing an anionic polymerization initiator of the present invention has a higher yield as well as a shorter reaction time compared to the batch reactor, it is possible to show excellent effects such as economical reduction of the preparation process time.

Furthermore, economy for mass production and stable quality due to the high yield can be not only secured, but also the preparation process time can be significantly reduced.

BRIEF DESCRIPTION OF DRAWINGS

FIG. 1 is a schematic configuration diagram of a device for preparing an anionic polymerization initiator according to one embodiment of the present invention.

FIG. 2 is a schematic configuration diagram of a device for preparing an anionic polymerization initiator according to another embodiment of the present invention.

FIG. 3 shows detailed structures of microchannels according to another embodiment of the present invention and fluid flows in the microchannels.

FIG. 4 shows the separated configuration and the combined configuration of a lower microchannel and an upper microchannel according to another embodiment of the present invention.

FIG. 5 is a schematic configuration diagram of a device for preparing an anionic polymerization initiator according to another embodiment of the present invention.

FIGS. 6 to 8 are $^1$H-NMR graphs of anionic polymerization initiators according to one embodiment of the present invention.

BEST MODE

Hereinafter, the present invention will be described in detail. Since the following detailed description is explanations for illustrating embodiments of the present invention in detail, even if there is a definite expression, the scope of rights defined by the claims is not limited.

If an anionic polymerization initiator is prepared in a batch reactor, which is a conventional art, there are problems such as a low synthetic yield and formation of an initiator inactivation reaction by storage.

Accordingly, the present inventors have found that the above-described problems are solved through the preparation method according to the present invention, and accomplished the present invention.

The present invention provides a method for preparing an anionic polymerization initiator comprising a step of introducing at least one amine compound selected from compounds of Formulas 1 and 2 and an organometallic compound into a continuous reactor to react them:

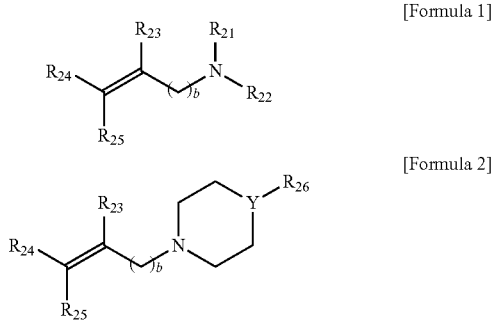

[Formula 1]

[Formula 2]

In Formula 1 and Formula 2 above, $R_{21}$, $R_{22}$, $R_{23}$, $R_{24}$ and $R_{25}$ independently represent hydrogen, an alkyl group having 1 to 6 carbon atoms, an alkenyl group having 1 to 6 carbon atoms or an alkynyl group having 1 to 6 carbon atoms.

Y represents nitrogen, oxygen or sulfur, $R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and b is an integer of 1 to 20.

In the present invention, the term "alkyl group" is defined as a functional group derived from a linear or branched saturated hydrocarbon.

Specific examples of the alkyl group may include a methyl group, an ethyl group, an n-propyl group, an iso-propyl group, an n-butyl group, a sec-butyl group, a tert-butyl group, an n-pentyl group, a 1,1-dimethylpropyl group, a 1,2-dimethylpropyl group, a 2,2-dimethylpropyl group, 1-ethylpropyl group, a 2-ethylpropyl group, an n-hexyl group, a 1-methyl-2-ethylpropyl group, a 1-ethyl-2-methylpropyl group, a 1,1,2-trimethylpropyl group, a 1-propylpropyl group, a 1-methylbutyl group, a 2-methylbutyl group, a 1,1-dimethylbutyl group, a 1,2-dimethylbutyl group, a 2,2-dimethylbutyl group, a 1,3-dimethylbutyl group, a 2,3-dimethylbutyl group, a 2-ethylbutyl group, a 2-methylpentyl group, a 3-methylpentyl group, and the like.

In the present invention, "an alkenyl group" or "an alkynyl group" means that at least one carbon-carbon double bond or triple bond is contained in the middle or end of the alkyl group as defined above.

In the present invention, the term "heteroatom" means oxygen, sulfur, nitrogen, phosphorus, silicon, bromine, chlorine or iodine, and the like.

In one example, the compound of Formula 1 above may include a compound of Formula 3 below and the compound of Formula 2 above may include a compound of Formula 4 below:

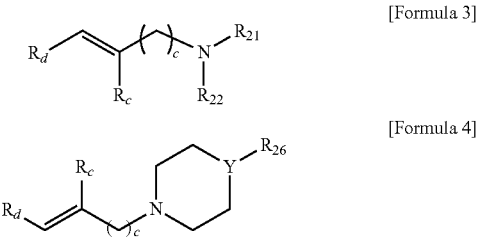

[Formula 3]

[Formula 4]

In Formulas 3 and 4 above, $R_{21}$ and $R_{22}$ independently represent hydrogen, an alkyl group having 1 to 6 carbon atoms, an alkenyl group having 1 to 6 carbon atoms, or an alkynyl group having 1 to 6 carbon atoms, $R_c$ and $R_d$ independently represent hydrogen or an alkyl group having 1 to 6 carbon atoms, Y represents nitrogen, oxygen or sulfur, $R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and c is an integer of 1 to 10.

Specifically, the compound represented by Formula 3 used in the present invention may include a compound of Formula 5 or 6 below, and the compound represented by Formula 4 may include a compound of Formula 7, 8 or 9 below:

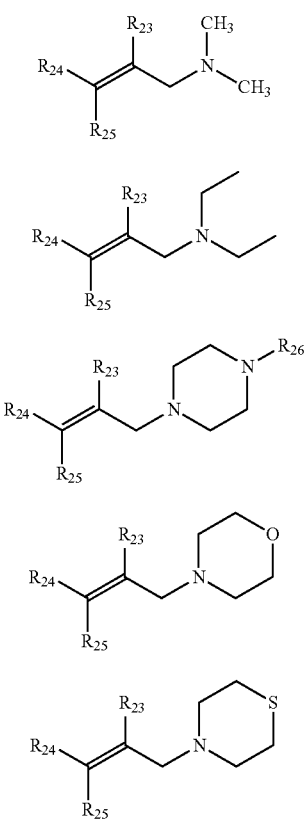

In Formulas 5 to 9 above, $R_{23}$, $R_{24}$ and $R_{25}$ independently represent hydrogen, an alkyl group having 1 to 6 carbon atoms, an alkenyl group having 1 to 6 carbon atoms or an alkynyl group having 1 to 6 carbon atoms, $R_{26}$ represents an alkyl group having 1 to 6 carbon atoms, an alkenyl group having 1 to 6 carbon atoms, an alkynyl group having 1 to 6 carbon atoms, or a hetero atom.

More specifically, the compound represented by Formula 3 of the present invention may comprise dimethylallylic amine and/or diethylallylic amine. In addition, the compound represented by Formula 4 of the present invention may comprise aryl morpholine amine.

The organometallic compound may comprise an organic component and a metal component, and may further comprise an element of Br (bromine) or an element of chlorine (Cl), if necessary. Here, the organic component may be composed of an alkyl group having 1 to 10 carbon atoms, an aryl group, an alkenyl group, or the like. Specifically, the organic component may be an n-butyl group, an n-pentyl group, an s-butyl group or a t-butyl group, and more specifically, an n-butyl group. Further, the metal component may be an alkali metal or an alkaline earth metal. Specifically, it may be lithium, sodium, potassium, magnesium, rubidium, cesium, strontium, beryllium or calcium, and more specifically lithium.

For example, the organometallic compound may comprise at least one selected from the group consisting of an organic alkali metal compound and an organic alkaline earth metal compound. Specifically, the usable alkali metal compound may be at least one selected from the group consisting of alkyl lithium, aryl lithium, alkenyl lithium, alkyl sodium, aryl sodium, alkenyl sodium, alkyl potassium, alkenyl potassium and aryl potassium. More specifically, n-butyl lithium (NBL) can be used. The alkaline earth metal compound may be an organomagnesium compound containing an element of Br (bromine) or an element of chlorine (Cl), or may be an organic calcium compound or an organic strontium compound, and more specifically, an alkyl magnesium halide having 1 to 6 carbon atoms can be used, which comprises methyl magnesium bromide ($CH_3MgBr$), ethyl magnesium bromide ($CH_3CH_2MgBr$), methyl magnesium chloride ($CH_3MgCl$), ethyl magnesium chloride ($CH_3CH_2MgCl$), and the like.

The compound of Formula 1 and/or Formula 2 above; and the organometallic compound may each include a solvent to be introduced into a reactor in the form of a solution of the compound of Formula 1 and/or Formula 2 above; and a solution of the organometallic compound.

As the solvent, a solvent which is a hydrocarbon compound and does not react with anions can be used, and specifically, one or more selected from linear hydrocarbon compounds such as pentane, hexane, heptane and octane; derivatives thereof having branched chains; cyclic hydrocarbon compounds such as cyclohexane and cycloheptane; aromatic hydrocarbon compounds such as benzene, toluene and xylene; and linear and cyclic ethers such as dimethyl ether, diethyl ether, anisole and tetrahydrofuran can be used. Specifically, cyclohexane, hexane, tetrahydrofuran and diethyl ether, more specifically, cyclohexane can be used.

The concentration of the solution of the compound of Formula 1 and/or Formula 2 above may be 0.1 to 50% by weight, the concentration of the solution of the organometallic compound may be 0.1 to 30% by weight, and the remaining amount may be the solvent.

The molar ratio of the compound of Formula 1 and/or Formula 2 above; and the organometallic compound in the present invention may be 1:5 to 5:1, specifically 1:1 to 1:1.2. If the molar ratio of the organometallic compound is higher or lower than the above range, there may be a problem that the formation of side reactants and unreacted products increases.

The total flow rate of the solution of the compound of Formula 1 and/or Formula 2 above; and the solution of the organic metal compound may be 0.01 to 500 g/min.

Specifically, when the solution of the compound of Formula 1 and/or Formula 2 above; and the solution of the organometallic compound are injected, the reaction temperature may be from −80 to 100° C., and the reaction time may be from 0.001 to 90 minutes. If the reaction temperature is too low, there may be a problem that the injected feedstock is frozen, and if the reaction temperature is too high, there may be a problem that the initiator is thermally decomposed. If the reaction time is too short, there may be a problem that the reaction conversion rate is low, and if the reaction time is too long, there may be a problem that the formation of the side reactants increases.

Also, before injecting the compound of Formula 1 and/or Formula 2 above; and the organometallic compound, a process of further mixing a polar additive may be included.

The polar additive may be at least one selected from the group consisting of tetrahydrofuran, ditetrahydrofuryl propane, diethyl ether, cycloamyl ether, dipropyl ether, ethylene dimethyl ether, ethylene dimethyl ether, diethylene glycol, dimethyl ether, tertiary hutoxyethoxyethane bis(2-dimethylaminoethyl) ethyl ether, (dimethylaminoethyl) ethyl ether, dioxane, ethylene glycol dimethyl ether, ethylene glycol dibutyl ether, diethylene glycol dimethyl ether, diethylene glycol dibutyl ether, dimethoxy benzene, 2,2-bis(2-oxolanyl) propane, dipiperidinoethane, pyridine, quinuclidine, trimethylamine, triethylamine, tripropylamine and tetramethylethylenediamine, potassium-tert-butyrate, sodium-tert-butyrate, sodium amylate, and triphenylphosphine.

According to the specific embodiment, a specific example of the reaction step includes a step in which a solution containing at least one selected from the group consisting of diethylallylic amine and aryl morpholine amine as an amine compound; and an NBL solution as a solution of an organometallic compound may be injected into a mixer in the continuous reactor.

In one example, the reaction of this step is as shown in Reaction Scheme 1 below, and Reaction Scheme 1 is a reaction scheme of a dimethylallylic amine solution and an NBL solution, and cyclohexane can be used as a solvent.

[Reaction Scheme 1]

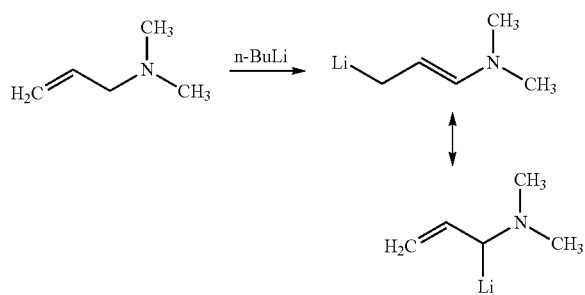

In Reaction Scheme 1 above, a primary reactant may comprise a primarily reacted product and/or the unreacted 3-dimethylallylic amine solution and NBL solution.

If the molar ratio of the compound of Formula 1 and/or Formula 2 above; and the organometallic compound (for example, NBL) is primarily reacted in the above-mentioned range, an amine compound-Li of the compound of Formulas 1 and/or 2, the desired intermediate material, may be prepared, while lowering formation of the unreacted products and by-products.

The method for preparing an anionic polymerization initiator according to the present invention may comprise a step of supplying a conjugated diene compound to the continuous reactor after the step of reacting the compound of Formula 1 and/or Formula 2 above and the organometallic compound.

As the conjugated diene compound, one or more from 1,3-butadiene (BD), isoprene (IP), 2,3-dimethyl-1,3-butadiene, 1,3-pentadiene, 3-methyl-1,3-pentadiene, 1,3-heptadiene and 1,3-hexadiene can be used, and specifically, 1,3-butadiene or isoprene can be used. The conjugated diene compound may include a solvent to be introduced into the reactor in the form of a solution of the conjugated diene compound. As the solvent, it is fine as long as it is usually usable, and specifically, cyclohexane, hexane, tetrahydrofuran, diethyl ether and the like can be used, and more specifically, cyclohexane can be used.

The concentration of the conjugated diene compound solution may be 1 to 100% by weight, and the remaining amount may be the solvent.

The molar ratio of the compound of Formula 1 and/or Formula 2 above; and the conjugated diene compound may be 1:1 to 1:100, specifically 1:2 to 1:10. If the molar ratio of the conjugated diene compound is higher than the above range, there may be a problem that the viscosity of the solution increases, and ff the molar ratio of the compound of Formula 1 and/or Formula 2 above is lower than the above range, there may be a problem that the compound without the attached diene compound increases.

The total flow rate of the primary reactant and the conjugated diene compound solution may be from 5 to 500 g/min, and the total reaction time may be from 3 to 60 minutes.

Specifically, the reaction temperature at the time of injecting the conjugated diene compound may be 10 to 100° C., and the reaction time may be 1 to 60 minutes. When the reaction temperature is too low, there may be a problem that the reaction initiation speed is slow, and when the reaction temperature is too high, there may be a problem that the initiator is thermally decomposed. If the reaction time is too short, there may be a problem that the reaction time is insufficient, and when the reaction time is too long, there may be a problem that unnecessary process cost is incurred in a state where the reaction is completed.

According to the specific embodiment, a specific example of the step of injecting the conjugated diene injection includes a step in which the reactant of the compound of Formula 1 and/or Formula 2 and the organometallic compound discharged from a first mixer of the continuous reactor, and an isoprene solution may be mixed in a second mixer and reacted. Here, the solvent of the isoprene solution may be cyclohexane.

According to a specific embodiment of the present invention, a pressure inside the continuous reactor may be 1 to 30 bar.

In the present invention, fluids of the inflow raw materials are sequentially introduced into the first mixer and the second mixer to perform to prepare an anionic polymerization initiator via a primary reaction and a secondary reaction, respectively. That is, since the preparation method of the present invention performs reactions stably and sequentially, by-products and unreacted products are not produced unlike the conventional process. Moreover, the anionic polymerization initiator can be produced at a high yield. Therefore, according to a specific embodiment of the present invention, the conversion rate of the amine compound can be 95% or more.

In addition, when an anionic polymerization initiator is prepared by the preparation method of the present invention and then directly introduced to synthesis of the solution-polymerized styrene-butadiene rubber (SSBR) by on-demand synthesis, the conventional storage stability problem of initiators may be solved and an amine group such as the compound of Formula 1 and/or Formula 2 may be introduced into the front-end of SSBR by improving the anionic initiator reactivity.

Furthermore, the present invention provides a device for preparing an anionic polymerization initiator characterized in that it comprises
a mixer; and
a first inflow line and a second inflow line, connected to the mixer,
wherein the first inflow line supplies at least one amine compound selected from compounds of Formulas 1 and 2 according to claim 1, and the second inflow line supplies an organometallic compound.

Specifically, the mixer may comprise a first mixer and a second mixer, connected in series, and
comprise a first and second inflow lines connected to the first mixer; and a third inflow line connected to the second mixer, and
the third inflow line may supply the conjugated diene compound.

More specifically, the mixer may have a structure in which the first mixer and the second mixer connected in series are repeated.

In one example, one or more of the first and second mixers may be a static mixer. Specifically, the first mixer may be a first static mixer, and the second mixer may be a second static mixer.

The static mixers may each independently comprise at least one selected from the group consisting of a plate mixer, a Kenics mixer, and a Sulzer mixer. In addition, the static mixers may be connected in series.

Specifically, the first inflow line may be provided at one end of the first static mixer, and the second inflow line may be provided in a horizontal or vertical direction with respect to the first inflow line. Also, the third inflow line may be connected to the second static mixer.

In addition, the device may further comprise a pressure control means for controlling an internal pressure. The amine compound of Formula 1 and/or Formula 2, the organolithium compound and the conjugated diene compound, injected into the device by the pressure control means can be mixed and reacted while flowing in the same direction.

In one example, at least one of the first and second mixers may be a microreactor, and the microreactor may comprise a plurality of microchannels repeating branching and joining.

Specifically, the first mixer may be a first microreactor and the second mixer may be a second microreactor.

In one example, one of the first and second mixers may be a static mixer and the other may be a microreactor. Specifically, the first mixer may be a static mixer and the second mixer may be a microreactor. Or the first mixer may be a microreactor and the second mixer may be a static mixer.

In one example, at least one of the first and second mixers may be a structure in which a static mixer and a microreactor are sequentially connected. Specifically, the first mixer may comprise a first static mixer and a first microreactor, and the second mixer may comprise a second static mixer and a second microreactor. More specifically, the microreactor may be connected to the front end of the static mixer.

FIG. 1 is a schematic configuration diagram of a device for preparing an anionic polymerization initiator according to one embodiment of the present invention, wherein the device may comprise a primary reaction zone (1), a first static mixer (2), a first inflow line (3), a second inflow line (4), a connecting tube (5), a secondary reaction zone (6), a second static mixer (7), a third inflow line (8), and an outlet port (9).

FIG. 2 is a schematic diagram of a device for preparing an anion polymerization initiator according to another embodiment of the present invention, wherein the device according to this embodiment may be mainly composed of a primary reaction zone (10) and a secondary reaction zone (20). The primary reaction zone (10) may comprise a first microreactor (11) and the secondary reaction zone (20) may comprise a second microreactor (21).

The first microreactor (11) may be a type of continuous reactor, which may be equipped with a first inflow line (12), a second inflow line (13) and a plurality of microchannels (14, 15). For example, the amine compound of Formula 1 and/or Formula 2 may be injected into the first inflow line (12), and for example, the organometallic compound may be injected into the second inflow line (13).

The microchannels (14, 15) may be connected to or comprise the first inflow line (12) and the second inflow line (13). The microchannels (14, 15) may be equipped with at least two, and these may form a plurality of branch points (junction points) (16) by repeating branching and joining. Although two microchannels, that is, only an upper microchannel (14) and a lower microchannel (15) are illustrated in the drawing, three or more microchannels are also possible.

The plurality of microchannels (14, 15) are branched periodically with making a diamond shape to form a regular pattern, but the overall shape and the branched pattern of the plurality of microchannels (14, 15) are not particularly limited, and may be changed, if necessary, and may be, for example, a circle, an ellipse, a spiral, a polygon, or the like, and also a pattern that straight line sections and curved sections are mixed or irregular.

The repeat count of branching and joining of the microchannels (14, 15) is not particularly limited and may be, for example, 5 to 1000 times, preferably 10 to 500 times, more preferably 50 to 200 times. If the repeat count of branching and joining of the microchannels (14, 15), that is, the number of the branch points (junction points) (16) is too small, the mixing effect may be deteriorated, and if it is too large, it may be difficult to manufacture the microchannels and the size of the mixer may become large.

The size of the microchannels (14, 15) is not particularly limited and may be, for example, 10 to 10000 micrometers, preferably 50 to 5000 micrometers, and more preferably 100 to 2000 micrometers. Here, the size of the microchannels (14, 15) may mean a diameter when the microchannels (14, 15) are circular and an average diameter when the microchannels (14, 15) are not circular. The diameter of the microchannels (14, 15) may be the same or different for each channel.

The first microreactor (11) can be divided and manufactured, and for example, completed by dividing it into an upper plate and a lower plate and then joining the two plates. The first inflow line (12), the second inflow line (13) and the microchannels (14, 15) may be configured so that all are arranged on the same plane, and also so that at least one of the first inflow line (12), the second inflow line (13) and the microchannels (14, 15) is arranged on another plane. In addition, the plurality of microchannels (14, 15) may be arranged in a two-dimensional (planar) form, or may also have a three-dimensional arrangement structure such as a spiral. Furthermore, the plurality of microchannels (14, 15) is arranged in the horizontal direction, so that each channel may be located at the same height, or alternatively, is arranged in the vertical direction, so that the heights of each channel may be different.

For example, fluid flows in a microchannel mixer divided into upper and lower plates and manufactured will be described as follows. While the A solution (the organometallic compound) injected into the upper plate and the B solution injected into the lower plate (the amine compound of Formula 1 and/or Formula 2) pass through the first branch point, the solutions may be branched after the A solution flows at the upper portion and the B solution flows at the lower portion. That is, the upper plate A solution and the lower plate B solution may be divided into their left side toward the left channel and their right side toward the right channel by the same amount. After being branched, the left flow can be induced to flow into only the upper plate, and the right flow can be induced to flow into only the lower plate. Thereafter, the fluid flowing into the upper plate and the fluid flowing into the lower plate meet at the second branch point, and the method of again being branched and meeting at the next branch point the same as the above-described contents can be repeated. Conceptually, the flow of two layers of A/B can be divided into two parts of A/B and A/B at the branch point, and then combined up and down to make a flow of four layers of A/B/A/B. If this is repeated, the flow is divided by the nth power of 2 to remarkably increase interfaces between A and B, so that the mixing effect can be maximized.

The second microreactor (21) may be connected in series with the first microreactor (11) via a connecting tube (17) and may be equipped with a third inflow line (22) and an outlet port (26) and a plurality of microchannels (23, 24) and a branch point (junction point) (25). The primary reactant of the first microreactor (11) may be injected through the connecting tube (17) and for example, the conjugated diene compound may be injected into the third inflow line (22) and the secondary reactant may be discharged into the outlet port (26). The second microreactor (21) may be configured the same as or similarly to the first microreactor (11).

FIG. 3 shows detailed structures of microchannels according to another embodiment of the present invention and fluid flows in the microchannels, and FIG. 4 shows the separated configuration and the combined configuration of a lower microchannel and an upper microchannel according to another embodiment of the present invention.

The first microreactor (11) may be configured to include an upper plate and a lower plate. An upper microchannel (14), the lower part of which is opened, may be formed on the upper plate and an upper microchannel (15) the upper part of which is opened, may be formed on the lower plate, and the upper and lower microchannels (14, 15) may be combined to form a closed channel in the longitudinal direction. The channel may have a rectangular cross section as in the drawing, and may also be manufactured in a circular shape, an elliptical shape, or other polygonal shapes. The upper and lower microchannels (14, 15) may have each inflow line (12a, 13a) and one common outlet port (17a). The inflow lines (12a, 13a) can be connected to the inflow lines (12, 13) and the inflow lines (12a, 13a) themselves can also extend to the outside of the upper plate and the lower plate to form the inflow lines (12, 13). The outlet port (17a) may be connected to the connecting tube (17) and the outlet port (17a) itself may extend to the outside of the upper plate and the lower plate to form the connecting tube (17).

The upper microchannel (14) may be equipped with a plurality of branch points (16a, 16b) disposed along the center and branched into two branches of the left and right branch channels (14a, 14b) at each branch point (16a, 16b), where each right branch channel (14b) may be extended and blocked and each left branch channel (14a) may be deflected toward the center and continuously extended to the next branch point (16b).

Thus, the reason why one side of the branch channel is closed and only the other side is continuously connected is to induce the fluid flow of the multi-layer structure. If one side of the branch channel is not blocked, the two fluids may hardly be mixed or the mixing effect may be insignificant.

Similarly, the lower microchannel (15) may be equipped with a plurality of branch points (16a, 16b) disposed along the center and branched into two branches of the left and right branch channels (15a, 15b) at each branch point (16a, 16b), where each left branch channel (15a) may be extended and blocked and each right branch channel (15b) may be deflected toward the center and continuously extended to the next branch point (16b).

Referring to FIG. 3, a first solution selected from a solution of an amine compound of Formula 1 and/or Formula 2 and a solution of an organometallic compound may be introduced into the inflow line (12a) of the upper microchannel (14), and a second solution may be introduced into the inflow line (13a) of the lower microchannel (15).

Then, while the upper and lower microchannels (14, 15) are combined, for example, in the case of the A point, the two layer flow passes through the channels, which is a first solution layer in the upper microchannel (14) and a second solution layer in the lower microchannel (15).

When the first branch point (16a) is reached, for example, in the case of the B point, the channel width may be expanded to increase the flow rate.

Then, during passing through the first branch point (16a), for example, in the case of the C point, the two layer flow may be branched into a two layer flow of the left branch channels (14a, 15a) and a two layer flow of the right branch channels (14b, 15b). To this point, it is possible to maintain the two layer flow having a flow rat nearly identical to the A point in each channel.

Then, while each branch channel (14b, 15a) passing through the closed point, for example, in the case of the D point, the left branch channel (14a) of the upper microchannel (14) is continued and the left branch channel (15a) of the lower microchannel (15) is closed, and thus the left two layer flow flows only into the left branch channel (14a) of the upper microchannel (14). Conversely, the right branch channel (14b) of the upper microchannel (14) is closed and the right branch channel (15b) of the lower microchannel (15) is continued, and thus the right two layer flow flows only into the right branch channel (15b) of the lower microchannel (15). At this time, since the fluids flows only into one microchannel, the flow rate of each channel at the D point is reduced to about half of the C point.

Then, at the second branch point (16b), for example, in the case of the E point, the left two layer flow which has flowed only upward and the right two layer flow which has flowed only downward may be combined at the center to form a four layer flow (the first solution layer/the second solution layer/the first solution layer/the second solution layer).

According to repetitions of the above-described process, a multi-layer flow can be subsequently formed by the nth power of 2 at each branch point.

In short, after the blue liquid of the lower plate and the red liquid of the upper plate flow, they may be divided into left and right at the branch point, and then the right flow may flow only into the lower plate to be led to the center and the left flow may flow only into the upper plate to be led to the center. That is, since the flows which have been divided up and down and introduced are divided into left and right and then led to the center to be again gathered up and down, the flows divided into two parts are combined at the center to become a four layer flow, and the flows divided into four parts are divided into two parts at the next branch point and combined at the center to become a eight layer flow, so that the repetitions at the branch point result in dividing the flow by the nth power of 2.

In this way, when the fluid flow in the microchannel is branched to left and right, the branched two flows can be led to the center to be combined up and down, and when the fluid flow in the microchannel is branched up and down, the branched two flows can be combined left and right.

FIG. 5 is a schematic configuration diagram of a device for preparing an anionic polymerization initiator according to another embodiment of the present invention, which is an embodiment adding static mixers (19, 28) to the device of FIG. 2. The static mixers (19, 28) may be connected in series with one or more mixers selected from the group consisting of a plate mixer, a Kenics mixer, and a Sulzer mixer.

In FIG. 5, the primary reaction zone (10) may comprise a first microreactor (11) and a first static mixer (19), and the secondary reaction zone (20) may comprise a second microreactor (21) and a second static mixer (28). The microreactors (11, 21) and the static mixers (19, 28) can be each connected in series via the connecting tubes (17, 18, 27).

Furthermore, the device according to the present invention may be further equipped with a pressure control means for controlling an internal pressure of the continuous reactor so that each material injected into the continuous reactor may flow side by side into the first microreactor (11) and the second microreactor (21) in the case of FIG. 2 and into the first microreactor (11), the first static mixer (19), the second microreactor (21) and the second static mixer (28) in the case of FIG. 5 and a flow in the reverse direction may be prevented.

That is, according to another embodiment of the present invention, the continuous process type reactor may be further equipped with a pressure control means for controlling the internal pressure. The amine compound of Formula 1 and/or Formula 2, the organometallic compound and the conjugated diene compound, injected inside the device by the pressure control means can be mixed and reacted while flowing in the same direction (downstream direction) at a pressure higher than or equal to the atmospheric pressure.

The first inflow line according to the present invention may be further supplied by mixing an amine compound of Formula 1 and/or Formula 2; and at least one polar additive selected from tetrahydrofuran, ditetrahydrofuryl propane, diethyl ether, cycloamyl ether, dipropyl ether, ethylene dimethyl ether, ethylene dimethyl ether, diethylene glycol, dimethyl ether, tertiary butoxyethoxyethane bis(2-dimethylaminoethyl) ether, (dimethylaminoethyl) ethyl ether, dioxane, ethylene glycol dimethyl ether, ethylene glycol dibutyl ether, diethylene glycol dimethyl ether, diethylene glycol dibutyl ether, dimethoxybenzene, 2,2-bis(2-oxolanyl) propane, dipiperidinoethane, pyridine, quinuclidine, trimethylamine, triethylamine, tripropylamine and tetramethylethylenediamine, potassium-tert-butyrate, sodium-tert-butyrate, sodium amylate and triphenylphosphine.

In the device for preparing an anionic polymerization initiator according to the present invention, the reaction temperature of the first mixer may be −80 to 100° C. and the reaction time may be 0.001 to 90 minutes, and the reaction temperature of the second mixer may be 10 to 70° C. and the reaction time may be carried out for 1 to 60 minutes.

In the device for preparing an anionic polymerization initiator according to the present invention, the molar ratio of the amine compound of Formula 1 and/or Formula 2 injected into the first inflow line and the organometallic compound injected into the second inflow line may be 5:1 to 5:5, and the molar ratio of the amine compound injected into the first inflow line and the conjugated diene compound injected into the third inflow line may be 1:1 to 1:100.

In addition, the present invention provides
an anionic polymerization initiator selected from compounds of Formulas 10 to 12:

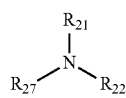
[Formula 10]

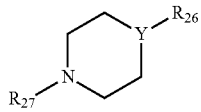
[Formula 11]

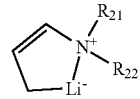
[Formula 12]

In Formulas 10 to 12 above,
$R_{21}$ and $R_{22}$ independently represent an alkyl group having 1 to 6 carbon atoms,
Y represents nitrogen, oxygen or sulfur,
$R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and
$R_{27}$ represents alkenyl lithium having 1 to 20 carbon atoms, alkenyl sodium having 1 to 20 carbon atoms, alkenyl potassium having 1 to 20 carbon atoms, alkenyl magnesium bromide having 1 to 6 carbon atoms or alkenyl magnesium chloride having 1 to 6 carbon atoms.

The anionic polymerization initiator of the present invention may have the structure of Formulas 5 to 7 above, thereby having a long carbon chain in one nitrogen.

In one example, the anionic polymerization initiator according to the present invention may comprise at least one compound of compounds of Formulas 13 to 16 below:

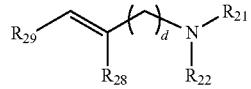
[Formula 13]

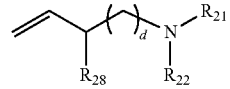
[Formula 14]

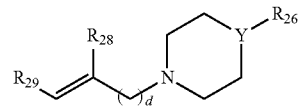
[Formula 15]

[Formula 16]

In Formulas 13 to 16 above,
$R_{21}$ and $R_{22}$ independently represent an alkyl group having 1 to 6 carbon atoms,
$R_{26}$ represents an alkyl group having 1 to 6 carbon atoms, an alkenyl group having 1 to 6 carbon atoms, an alkynyl group having 1 to 6 carbon atoms, or a hetero atom,
$R_{28}$ and $R_{29}$ independently represent hydrogen or alkyllithium having 1 to 20 carbon atoms, and at least one of $R_{28}$ and $R_{29}$ represents alkyllithium, and
d is an integer of 0 to 19.

More specifically, the anionic polymerization initiator according to the present invention may comprise at least one compound of compounds of Formulas 17 to 28 below:

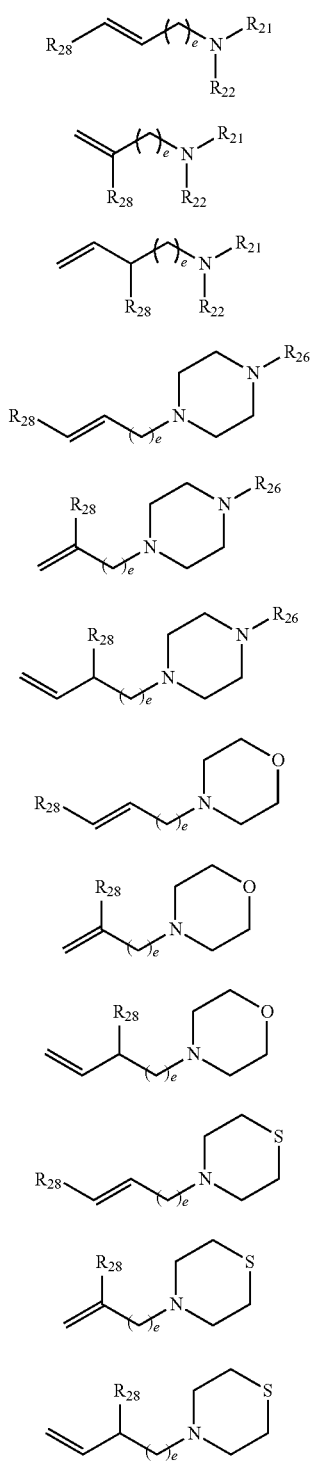

[Formula 17]
[Formula 18]
[Formula 19]
[Formula 20]
[Formula 21]
[Formula 22]
[Formula 23]
[Formula 24]
[Formula 25]
[Formula 26]
[Formula 27]
[Formula 28]

In Formulas 17 to 28 above, $R_{21}$ and $R_{22}$ independently represent an alkyl group having 1 to 6 carbon atoms, $R_{26}$ represents an alkyl group having 1 to 6 carbon atoms, an alkenyl group having 1 to 6 carbon atoms, an alkynyl group having 1 to 6 carbon atoms, or a hetero atom, $R_{28}$ represents hydrogen and/or alkyl lithium having 1 to 20 carbon atoms, and e is an integer of 0 to 5.

The anionic polymerization initiator of the present invention may have any one structure of Formulas 17 to 28 above, thereby having a long carbon chain in one nitrogen.

The anionic polymerization initiator may be prepared by using the above-described preparation method.

The anionic polymerization initiator produced by using the device and method for preparing as described above is provided. The anionic polymerization initiator may be a lithium amide type in which one terminal is modified with an amine. That is, the anionic polymerization initiator provided in the present invention may be an anionic polymerization initiator containing a tertiary amine group, and may be a lithium amide-based anionic polymerization initiator in which one terminal is modified with an amine.

Besides, in the prior art, the anionic polymerization initiator was prepared by a batch process and used to prepare a solution-polymerized styrene-butadiene rubber, or it was carried out in one pot simultaneously to prepare the anion polymerization initiator and the solution polymerized styrene-butadiene in a batch reactor. In the case of the former, a step of storing the modified initiator is necessarily required and thus the deactivation of the synthesized initiator causes over time. This may be a factor to deteriorate physical properties of the finally synthesized SSBR by adversely affecting the post-process, and makes it difficult to maintain a constant quality. In the case of the latter, it is a process in which the polymerization reaction occurs in the same batch reactor simultaneously with the initiator synthesis reaction, which can solve the storage problem. However, it is difficult to confirm whether the modified initiator is properly synthesized, and the physical properties are also lower than the case of adding the synthesized initiator.

In the present invention, the anionic polymerization initiator may be continuously prepared during transportation by using a continuous reactor comprising at least one of a static mixer and a microreactor, thereby preventing side reactions and obtaining a high yield.

In addition, when an anionic polymerization initiator is prepared by the preparation method of the present invention and then directly introduced to synthesis of the solution-polymerized styrene-butadiene rubber (SSBR) by on-demand synthesis, the conventional storage stability problem of initiators may be solved and a tertiary amine group may be introduced into the front-end of SSBR by improving the anionic initiator reactivity.

Mode for Invention

Hereinafter, the present invention will be described in more detail based on examples, but the following examples are for illustrating the present invention, and the scope of rights of the present invention is not limited to the following examples.

EXAMPLE 1

An anionic polymerization initiator was prepared using the continuous reactor of FIG. 1.

Two stainless steel pressure vessels as vacuum-dried were prepared. The first pressure vessel was charged with 400 g of cyclohexane, 200 g of dimethylallylic amine and 273 g of tetramethylethylenediamine to prepare a dimethylallylic amine solution. Then, the other pressure vessel was charged with 940 g of a liquid 2.5M n-butyllithium dissolved in a hexane solution and 330 g of hexane to prepare an n-butyllithium solution.

The pressure of each pressure vessel was maintained at 5 bar. And, using a mass flow meter, the dimethylallylic amine solution was injected into the first inflow line at 1.0 g/min and the n-butyllithium solution was injected into the second inflow line at 1.0 g/min. The first mixer was maintained at 25° C. and the pressure inside the continuous reactor was maintained at 2 bar using a back pressure regulator. The residence time of the second mixer was controlled to be within 30 minutes and the reactor was maintained at 50° C. The molar ratio of n-butyllithium and the molar ratio of tetramethylethylenediamine were 1.0 times based on the molar ratio of dimethylallylic amine.

EXAMPLE 2

An anionic polymerization initiator was prepared using the continuous reactor of FIG. 1.

Two stainless steel pressure vessels as vacuum-dried were prepared. The first pressure vessel was charged with 400 g of cyclohexane, 280 g of dimethylallylic amine and 287 g of tetramethylethylenediamine to prepare a dimethylallylic amine solution. Then, the other pressure vessel was charged with 760 g of a liquid 2.5M n-butyllithium dissolved in a hexane solution and 320 g of hexane to prepare an n-butyllithium solution.

The pressure of each pressure vessel was maintained at 5 bar. And, using a mass flow meter, the dimethylallylic amine solution was injected into the first inflow line at 1.0 g/min and the n-butyllithium solution was injected into the second inflow line at 1.0 g/min. The first and second mixers were maintained at 25° C. and the pressure inside the continuous reactor was maintained at 2 bar using a back pressure regulator. The residence time of the first and second mixers was controlled to be within 20 minutes. The molar ratio of n-butyllithium and the molar ratio of tetramethylethylenediamine were 1.0 times based on the molar ratio of dimethylallylic amine.

EXAMPLE 3

An anionic polymerization initiator was prepared using the continuous reactor of FIG. 1.

Two stainless steel pressure vessels as vacuum-dried were prepared. The first pressure vessel was charged with 400 g of cyclohexane, 253 g of aryl morpholine amine and 231 g of tetramethylethylenediamine to prepare an aryl morpholine amine solution. Then, the other pressure vessel was charged with 548 g of a liquid 2.5M n-butyllithium dissolved in a hexane solution and 330 g of hexane to prepare an n-butyllithium solution.

The pressure of each pressure vessel was maintained at 6 bar. And, using a mass flow meter, the aryl morpholine amine solution was injected into the first inflow line at 1.0 g/min and the n-butyllithium solution was injected into the second inflow line at 1.0 g/min. The first and second mixers were maintained at 0° C. and the pressure inside the continuous reactor was maintained at 3 bar using a back pressure regulator. The residence time of the first and second mixers was controlled to be within 10 minutes. The molar ratio of n-butyllithium and the molar ratio of tetramethylethylenediamine were 1.0 times based on the molar ratio of aryl morpholine amine.

Experimental Example 1

Using the anionic initiators prepared in Examples 1 to 3 and styrene and butadiene monomers, they were polymerized by a polymerization conversion rate of 99%. The polymerized polymer was analyzed by $^1$H-NMR to confirm that the initiator was synthesized and present at the end of the polymer.

Reviewing FIGS. 6 to 8, the hydrogen atom peaks of carbon bonded with amine can be confirmed at 2.5~3.0 ppm in $^1$H-NMR data of the anion initiators of Examples 1 to 3. Through the above data, it can be seen that amine groups are contained in the polymerized polymer.

INDUSTRIAL APPLICABILITY

Since the present invention has a shorter reaction time and a higher yield compared to the batch type reactor, it can exhibit excellent effects such as economical reduction of the production process time.

The invention claimed is:

1. A method for preparing an anionic polymerization initiator comprising:
    introducing an amine compound of Formula 2 below and an organometallic compound into a continuous reactor to react them:

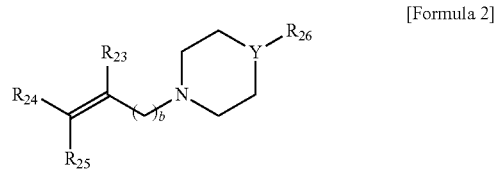

[Formula 2]

wherein, $R_{23}$, $R_{24}$ and $R_{25}$ independently represent hydrogen, an alkyl group having 1 to 6 carbon atoms, an alkenyl group having 1 to 6 carbon atoms or an alkynyl group having 1 to 6 carbon atoms, Y represents nitrogen, oxygen or sulfur, $R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and b is an integer of 1 to 20.

2. The method for preparing an anionic polymerization initiator according to claim 1, wherein
    the compound of Formula 2 is a compound of Formula 4 below:

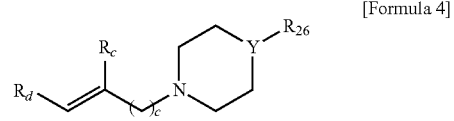

[Formula 4]

wherein, $R_c$ and $R_d$ independently represent hydrogen or an alkyl group having 1 to 6 carbon atoms, Y represents nitrogen, oxygen or sulfur, $R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and c is an integer of 1 to 10.

3. The method for preparing an anionic polymerization initiator according to claim 1, wherein
the organometallic compound comprises at least one selected from the group consisting of an organic alkali metal compound and an organic alkaline earth metal compound.

4. The method for preparing an anionic polymerization initiator according to claim 1, further comprising
supplying a conjugated diene compound to the continuous reactor after the reacting of the amine compound of Formula 2 and the organometallic compound.

5. The method for preparing an anionic polymerization initiator according to claim 1, wherein
a molar ratio of the amine compound of Formula 2 and the organometallic compound is 5:1 to 1:5.

6. The method for preparing an anionic polymerization initiator according to claim 4, wherein
a molar ratio of the amine compound of Formula 2 and the conjugated diene compound is 1:1 to 1:100.

7. The method for preparing an anionic polymerization initiator according to claim 1, wherein the continuous reactor comprises
a mixer; and
a first inflow line and a second inflow line, connected to said mixer,
wherein the first inflow line supplies the amine compound of Formula 2, and the second inflow line supplies the organometallic compound.

8. The method for preparing an anionic polymerization initiator according to claim 7, wherein
the mixer comprises a first mixer and a second mixer, connected in series, and
comprises a first and second inflow lines connected to the first mixer; and a third inflow line connected to the second mixer, and
the third inflow line supplies a conjugated diene compound.

9. The method for preparing an anionic polymerization initiator according to claim 8, wherein
one or more of the first and second mixers are a static mixer.

10. The method for preparing an anionic polymerization initiator according to claim 9, wherein
the static mixers are each independently at least one selected from the group consisting of a plate mixer, a Kenics mixer and a Sulzer mixer.

11. The method for preparing an anionic polymerization initiator according to claim 8, wherein
one or more of the first and second mixers are a microreactor,
said microreactor comprises a plurality of microchannels repeating branching and joining.

12. The method for preparing an anionic polymerization initiator according to claim 8, wherein
one or more of the first and second mixers have a structure in which a static mixer and a microreactor are connected.

13. The method for preparing an anionic polymerization initiator according to claim 8, wherein
a reaction temperature of the first mixer is −80° C. to 100° C. and a reaction time in the first mixer is 0.001 to 90 minutes, and
a reaction temperature of the second mixer is 10° C. to 100° C. and a reaction time in the second mixer is 1 to 60 minutes.

14. The method for preparing an anionic polymerization initiator according to claim 1, wherein
the anionic polymerization initiator is selected from compounds of Formula 11 or 12 below:

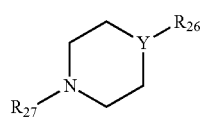
[Formula 11]

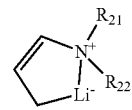
[Formula 12]

wherein,
$R_{21}$ and $R_{22}$ independently represent an alkyl group having 1 to 6 carbon atoms,
Y represents nitrogen, oxygen or sulfur,
$R_{26}$ is absent when Y is oxygen or sulfur, and represents an alkyl group having 1 to 6 carbon atoms, an alkenyl group having 1 to 6 carbon atoms, an alkynyl group having 1 to 6 carbon atoms or a hetero atom when Y is nitrogen, and
$R_{27}$ represents alkenyl lithium having 1 to 20 carbon atoms, alkenyl sodium having 1 to 20 carbon atoms, alkenyl potassium having 1 to 20 carbon atoms, alkenyl magnesium bromide having 1 to 6 carbon atoms or alkenyl magnesium chloride having 1 to 6 carbon atoms.

* * * * *